United States Patent
Wesch et al.

(10) Patent No.: US 7,140,668 B2
(45) Date of Patent: Nov. 28, 2006

(54) PROCESS AND COMPONENTS FOR FIXING BULKHEAD PARTS

(75) Inventors: Karl Wesch, Waldbrunn (DE); Ralph Dalhaeuser, Viernheim (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 11/064,897

(22) Filed: Feb. 24, 2005

(65) Prior Publication Data

US 2005/0166500 A1    Aug. 4, 2005

Related U.S. Application Data

(63) Continuation of application No. PCT/EP03/09154, filed on Aug. 19, 2003.

(30) Foreign Application Priority Data

Aug. 28, 2002  (DE) ................................ 102 40 196

(51) Int. Cl.
  *B62D 29/04*   (2006.01)
  *B32B 1/00*    (2006.01)

(52) U.S. Cl. ............................ 296/187.02; 296/203.03; 52/232

(58) Field of Classification Search .......... 296/187.02, 296/203.03, 205, 193.06; 52/232, 716.5, 52/716.6
See application file for complete search history.

(56) References Cited

U.S. PATENT DOCUMENTS

| | | | |
|---|---|---|---|
| 1,993,307 A | 3/1935 | Nicholson | |
| 4,810,548 A | 3/1989 | Ligon, Sr. et al. | |
| 5,642,914 A | 7/1997 | Takabatake | |
| 5,979,902 A | 11/1999 | Chang et al. | |
| 6,186,581 B1 | 2/2001 | Onoue | |
| 6,305,430 B1 | 10/2001 | Ishikawa | |
| 6,358,584 B1 | 3/2002 | Czaplicki | |

FOREIGN PATENT DOCUMENTS

| | | |
|---|---|---|
| EP | 0 453 777 A2 | 10/1991 |
| EP | 1 031 491 A1 | 8/2000 |
| EP | 1 037 767 B1 | 9/2001 |
| JP | 07-205835 | 8/1995 |
| JP | 2002-99281 A | 4/2002 |
| WO | WO 95/25005 A1 | 9/1995 |
| WO | WO 01/34453 A1 | 5/2001 |
| WO | WO 01/42076 A1 | 6/2001 |
| WO | WO 01/68342 A1 | 9/2001 |
| WO | WO 01/71225 A1 | 9/2001 |
| WO | WO 01/83206 A1 | 11/2001 |

OTHER PUBLICATIONS

Patent Abstracts of Japan, vol. 2002, No. 8 for JP 2002 099281 (2002).
Patent Abstracts of Japan, vol. 1995, No. 11 for JP 08 205835 (1995).
"Testing of plastic films, determination of the collection of friction", DIN 53375, pp. 1-5 (1986).

*Primary Examiner*—Jeanette Chapman
(74) *Attorney, Agent, or Firm*—Stephen D. Harper

(57) ABSTRACT

A molding is described, the outer edge region of which comprises a thermally expandable material that has a high coefficient of friction in relation to metal or plastic. In its inner region this molding has an aperture and/or recess for receiving a mounting aid. The molding is suitable as a sealing and acoustically active bulkhead part and with the aid of friction forces can be fixed mechanically in the cavity of structural components without these components having to exhibit bores, apertures or other devices for fixing the bulkhead part.

30 Claims, 5 Drawing Sheets

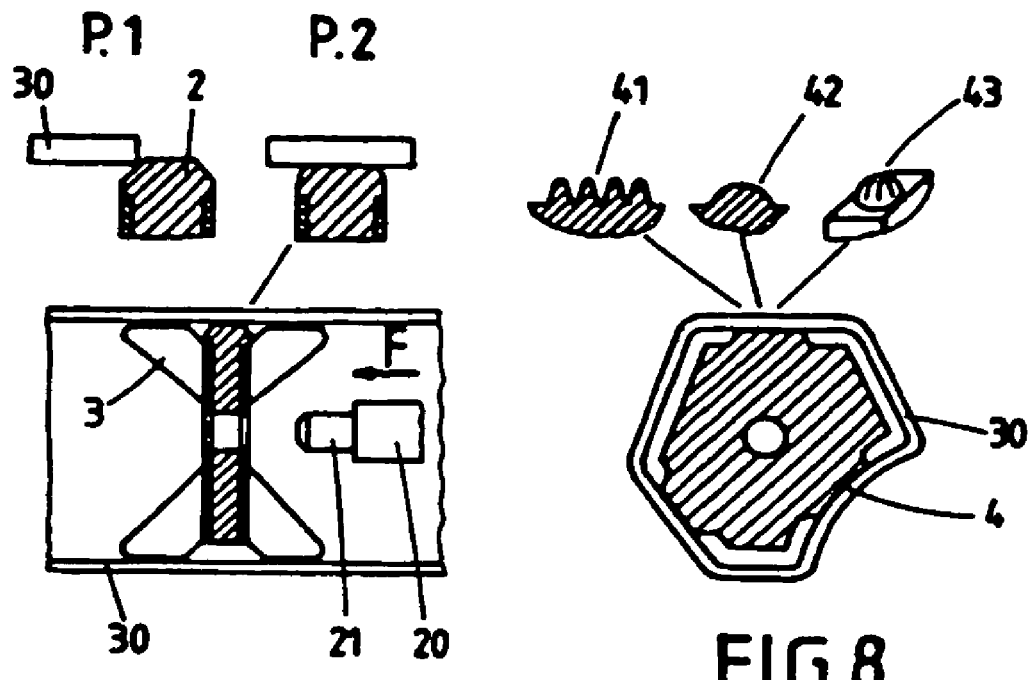
FIG.7
FIG.8
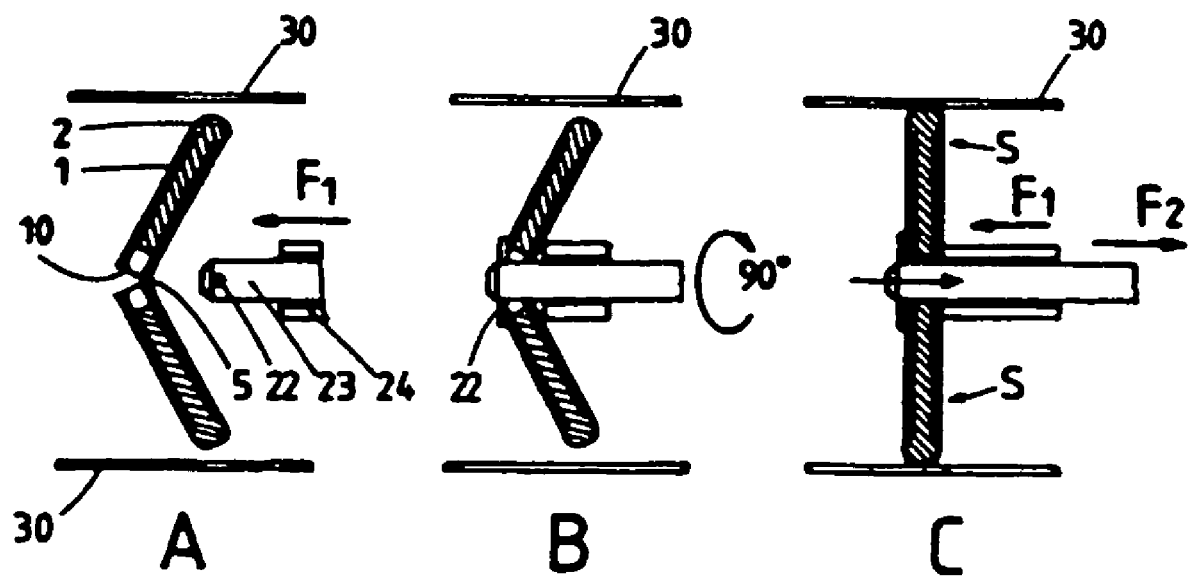
FIG.9

PROCESS AND COMPONENTS FOR FIXING BULKHEAD PARTS

CROSS-REFERENCE TO RELATED APPLICATIONS

This application is a continuation under 35 USC Sections 365(c) and 120 of International Application No. PCT/EP2003/009154 filed 19 Aug. 2003 and published 25 Mar. 2004 as WO 2004/024540/054049, which claims priority from German Application No. 10240196.9, filed 28 Aug. 2002, each of which is incorporated herein by reference in its entirety.

FIELD OF THE INVENTION

The present invention relates to acoustically active and sealing bulkhead parts that are suitable for mechanical fixation in the cavity of structural components and also to a process for fixing said bulkhead parts in the cavities of said structural components.

DISCUSSION OF THE RELATED ART

Modern vehicle concepts and structural designs of vehicles have a plurality of cavities which have to be sealed in order to prevent the ingress of moisture and contaminants, since the latter can result in corrosion from the inside on the corresponding body parts. This applies, in particular, to modern self-supporting body constructions in which a heavy frame construction is replaced by so-called "space frames". With the latter, use is made of a lightweight, structurally solid chassis made of prefabricated hollow sections. Such constructions have, depending upon the specific system, a number of cavities which have to be sealed against the penetration of moisture and contaminants. Since, in addition, these cavities transmit airborne sound in the form of unpleasant vehicle running noises and wind noises, such sealing measures also serve to lessen the noises and therefore to enhance the comfort of travelling in the vehicle. With the traditional type of construction, these frame parts and body parts containing cavities were prefabricated from half-shell components which were joined at a later time by welding and/or adhesive bonding so as to form the closed hollow section. With such a type of construction the cavity in the early bodywork state of a vehicle body was accordingly easily accessible, so that sealing and acoustically damping bulkhead parts could be fixed in this early phase of body construction by mechanical hanging, by insertion into appropriate holding devices, bores or by welding.

In modern vehicle manufacture using "space frame" technology, however, prefabricated hollow sections are employed having cavities that are accessible only through the cross-sectional apertures at the end of these sections. Such hollow sections are conventionally produced nowadays from steel materials, aluminum materials or plastic materials using the extrusion process, by hydroforming, by die casting or by drawing processes.

In English terminology, bulkhead parts that bring about a sealing and/or acoustic effect in such cavities are also called "pillar fillers" or "baffles" or "acoustic baffles". As a rule, they consist either completely of thermally expandable moldings or of moldings that contain a support and, in their peripheral region, expandable polymeric binding agents. These bulkhead parts are then fastened in the body shell by hanging, clipping, screw coupling or welding onto the open structures that are used for construction. After the structures that are used for construction in the body shell have been closed and after the further preliminary treatments of the body, the process heat of the ovens is then utilised for the purpose of curing the cathodic electrodeposition coating (e-coat), in order to trigger the expansion of the expandable part of the bulkhead part, in order consequently to seal the cross-section of the cavity.

For the purpose of sealing such cavities, EP 0 453 777 A2 proposes providing a preformed plug made of an expandable sealant material. Said plug is then intended to be inserted into an aperture created for this purpose in the hollow section, whereby the expandable part protrudes into the interior space of the hollow section and expands there in the oven for the cathodic electrodeposition coating, so that the sealing action takes place. This method is not suitable for preformed hollow sections that do not have an auxiliary aperture.

U.S. Pat. No. 4,810,548 discloses a sandwich-type component made of an expandable foam material by way of core material which is arranged between two bounding plates made of a relatively rigid material. One or more of these plates has, in addition, stabilizing and directing "feet" or clips which also serve for mechanical fixing of the component in apertures which are provided in the cavity to be formed later.

WO 95/25005 describes a composite material comprising a support which consists of two plates connected to one another and which bounds a space between said plates. Arranged in this space is a material that is capable of foaming under the influence of heat and that, when heat is supplied, emerges in the foamed state from the bounded space through at least one aperture in the support and therefore brings about the sealing. The support is provided with means for positioning and/or fixing the composite material in the cavity. By virtue of the closed structures of a hollow section of the aforementioned type, this component cannot be introduced into the cavity of the hollow section.

WO 01/71225 describes an expandable bulkhead part for sealing cavities in automobiles. This bulkhead part comprises a thermally expandable sealing material that is able to expand at the temperatures of the lacquer oven. Moreover, the bulkhead part comprises a support which positions and fixes the expandable material at the predetermined point in the cavity until the thermal expansion sets in. The support further has at least one clip or a snap-action or plug-in device which is inserted under pressure into a corresponding bore or aperture in the hollow-space structure in order to fix the component.

U.S. Pat. No. 5,642,914 proposes a bulkhead part made of an expandable material and a metallic support, whereby the support has fixing flanges, with the aid of which this component is intended to be fastened to the inner surface of the hollow structure by spot welding.

WO 01/83206 describes a bulkhead part for use in the cavity of a structural component of a vehicle body for the purpose of damping acoustic sound-waves and for the purpose of stiffening the component at right angles to the longitudinal axis of the structural component. The bulkhead part consists of a plastic support with an edge region. Arranged in the edge region is a continuous strip of an expandable material. Moreover, the support is intended to have a fixing means in the form of a clip which is intended to be inserted into the holes provided for this purpose in the wall of the structural component. Such bulkhead parts are also not suitable to be introduced into prefabricated hollow sections. Similar components with clip-type fixing means that require corresponding bores in the structural components and are only capable of being inserted into open section parts are described by EP 1 031 491 B1 and EP 1 03 7 767 B1.

BRIEF SUMMARY OF THE INVENTION

In view of this state of the art, the inventors have set themselves the task of making available bulkhead parts having a sealing and acoustically effective function that are suitable for enabling mechanical fixation in prefabricated hollow sections without mounting apertures or bores, such hollow sections being preferably employed as structural components in modern vehicle manufacture.

The present invention provides moldings that have in their outer edge region a high coefficient of friction in relation to metals and/or plastics and that in the inner region of the molding have an aperture and/or recess for receiving a mounting aid. These moldings find application mainly as a sealing and/or acoustically active bulkhead part in hollow sections for automobile construction.

A further subject of the present invention is a process for fixing these bulkhead parts in hollow sections, wherein firstly the bulkhead part is connected to a mounting aid and subsequently the bulkhead part is inserted into the hollow section with the aid of this mounting aid and is fixed there, the mounting aid being subsequently removed from the hollow section.

As a rule, this mounting aid takes the form of a lance, a rod or a tube; it may be rigid, bent or flexible in the manner of a so-called flexishaft; it may optionally have articulations. It may also be bipartite in the form of a tube with a core or rod which is mobile therein or in the form of two parallel rods. In principle, this mounting aid may be produced from a large number of materials; mention may be made, in exemplary manner, of metals, plastics or fiber-reinforced plastics.

BRIEF DESCRIPTION OF THE DRAWINGS

FIG. 7 shows mounting in a hollow section with uniform cross-sectional aperture.

FIG. 8 shows a cross-section through an irregularly shaped hollow section.

FIG. 9 shows mounting of a hollow section with folding mechanism.

DETAILED DESCRIPTION OF CERTAIN EMBODIMENTS OF THE INVENTION

Figure 1:
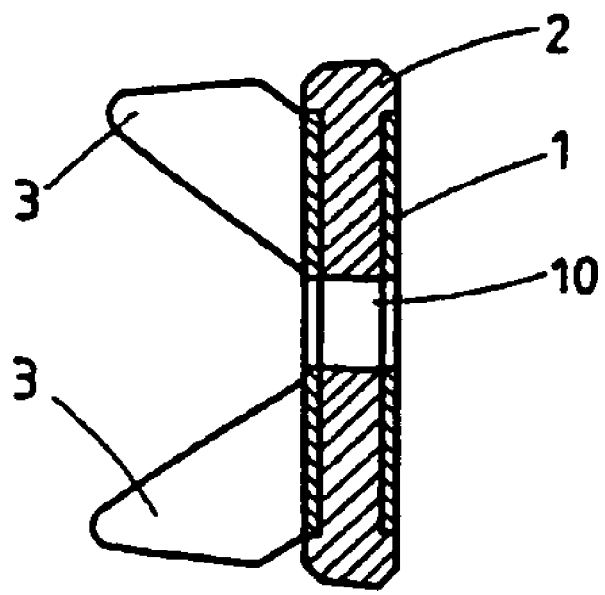
FIG. 1 shows a bulkhead part with two supporting shackles.

The bulkhead part may, on the one hand, be manufactured integrally from an expansible plastic material without support; in a large number of applications, however, it has proved expedient to choose a bipartite form of construction such that the bulkhead part consists of a support that remains dimensionally stable also at the expansion temperatures and that has a thermally expandable material in its edge region.

The support material may be formed from metal or preferably from thermoplastics, in which case the thermoplastics may optionally be fiber-reinforced. Preferred thermoplastics are polyamides, polyimides, polyoxypropylene or polyethylene terephthalate.

In order to guarantee a fixing action of the component in its mounted position, the plastic of the bulkhead part has in the outer edge region a sufficiently high coefficient of friction in relation to metal and/or plastic of the inner wall of the hollow section, in order that the bulkhead part is held in its mounted position by friction forces. A sufficiently high coefficient of friction $\mu$ is therefore preferably a value, measured in accordance with DIN 53375, of at least 0.3, preferably at least 0.5 to 0.7. Suitable polymeric base binding agents for this purpose are, for example, ethylene/vinyl-acetate copolymers (EVA), copolymers of ethylene with (meth)acrylate esters, which optionally also contain (meth)acrylic acid incorporated proportionately by polymerisation, random copolymers or block copolymers of styrene with butadiene or isoprene or the hydrogenation products thereof. The latter may also be tri-block copolymers of the SBS, SIS type or the hydrogenation products thereof SEBS or SEPS. In addition, the binding agents may also contain cross-linking agents, coupling agents, plasticizers as well as further auxiliary substances and additives. With a view to achieving a sufficient foaming capacity and expansibility, these polymeric binding agents also contain blowing agents. Suitable, in principle, by way of blowing agents are all known blowing agents such as, for example, the "chemical blowing agents" which release gases as a result of decomposition or "physical blowing agents", i.e. expanding hollow beads. Examples of the first-mentioned blowing agents are azobisisobutyronitrile, azodicarbonamide, dinitrosopentamethylenetetramine, 4,4'-oxybis(benzenesulfonic acid hydrazide), diphenylsulfone-3,3'-disulfohydrazide, benzene-1,3-disulfohydrazide, and p-toluenesufonylsemicarbazide. Examples of the physical blowing agents are expandable plastic hollow microbeads based on polyvinylidene-chloride copolymers or acrylonitrile/(meth)acrylate copolymers, such as are commercially available, for example, under the names "Dualite" and "Expancel" from Pierce & Stevens and Casco Nobel, respectively.

As a rule, the thermally expandable material completely surrounds the support and is preferably located in a U-shaped boundary, whereby, as a rule, the thermally expandable material protrudes from the open side of the U-shaped part.

A number of particularly preferred embodiments will now be elucidated in greater detail on the basis of the drawings.

FIG. 1 shows a longitudinal section through a bulkhead part consisting of an inner support (1) which consists of a thermoplastic (optionally fiber-reinforced) or a metal sheet. The interspace between the two support plates is filled out by a thermally expandable material (2) which protrudes beyond the edge region of the interspace formed by the support plates. In this connection the thermally expandable material completely surrounds the edge region of the support as a rule, but this does not mean that the support material may not also have interruptions in the edge region, brought about by supporting ribs which may possibly be necessary between the two plates of the support. In this embodiment "wingtype" supporting shackles (3) which are connected to the support plate either resiliently or rigidly are attached to the support plate perpendicular to the transverse face. Ordinarily these supporting shackles are formed from the same material as the support plate and, in the case of supports made of thermoplastic, are formed jointly with the support plate in an injection-molding process.

Figure 2:
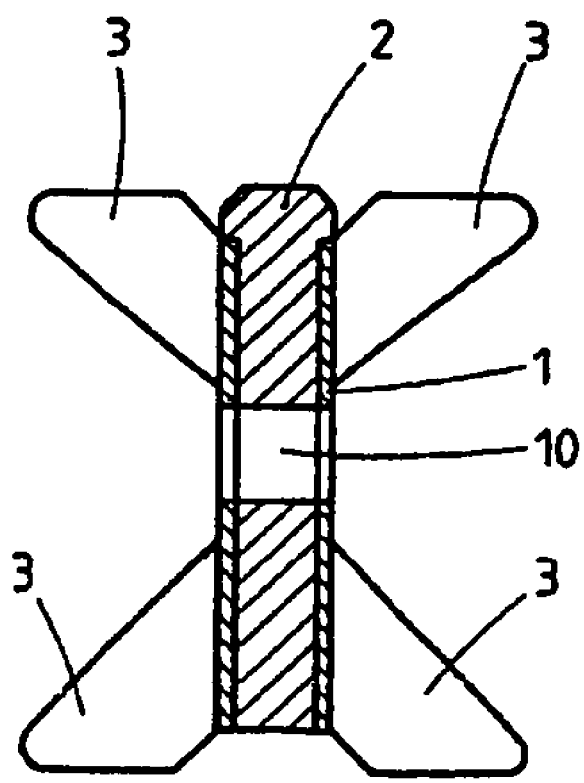
FIG. 2 shows a bulkhead part with four supporting shackles.

FIG. 2 shows a bulkhead part similar to that in FIG. 1, but this bulkhead part has four supporting shackles (3) which are each arranged perpendicular to the transverse face of the support (1). In FIG. 2, an embodiment is represented in which the thermally expandable material in the unexpanded form protrudes from the support-plate interspace on one side only. Also in this case the supporting shackles (3) may be resiliently supported.

Figures 3, 4:
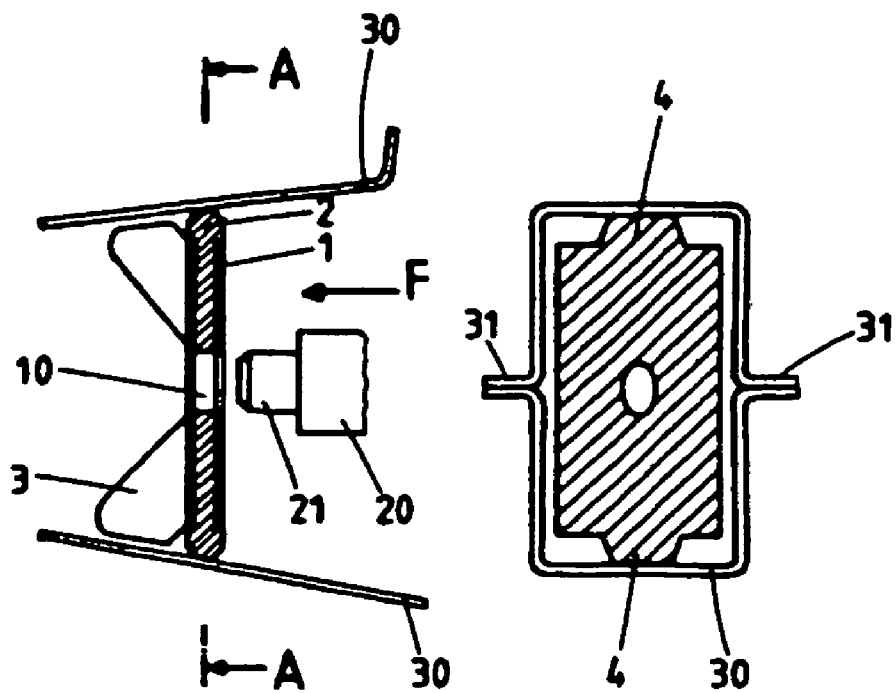
FIG. 3 shows mounting of a bulkhead part according to FIG. 1 in a hollow section.
FIG. 4 shows a section according to line A—A in FIG. 2.

FIG. 3 shows the installation position of a bulkhead part according to FIG. 1 in a hollow section which has a tapering cross-section of its cavity. This means that the walls (30) of the hollow section are not parallel. Shown furthermore is a mounting aid consisting of a rod (20) which in its front part has a taper (21) which is so dimensioned that it is able to engage the aperture (10) in the bulkhead part. With a view to installation, the mounting aid (20) and the bulkhead part are pushed jointly in the arrow direction F until the bulkhead part is held in its mounting position on the inner walls of the hollow section (30) by the friction forces of the contact faces of the thermally expandable material (2).

FIG. 4 shows a cross-section along line A—A in FIG. 3. Here it is shown that the contact faces of the projections (4) of the thermally expandable material touch the inner walls of the hollow section (30) at two places and in this way fix the bulkhead part by virtue of the friction forces. The support material is not represented in this illustration, nor are the supporting wings and the mounting aid. Represented here is a hollow section that has been joined from two sheet-metal moldings or castings at the flanges (31) so as to form a hollow section. However, hollow sections can also be employed that have been produced integrally without a seam, for example using the continuous-casting or die-casting processes.

Figures 5, 6:
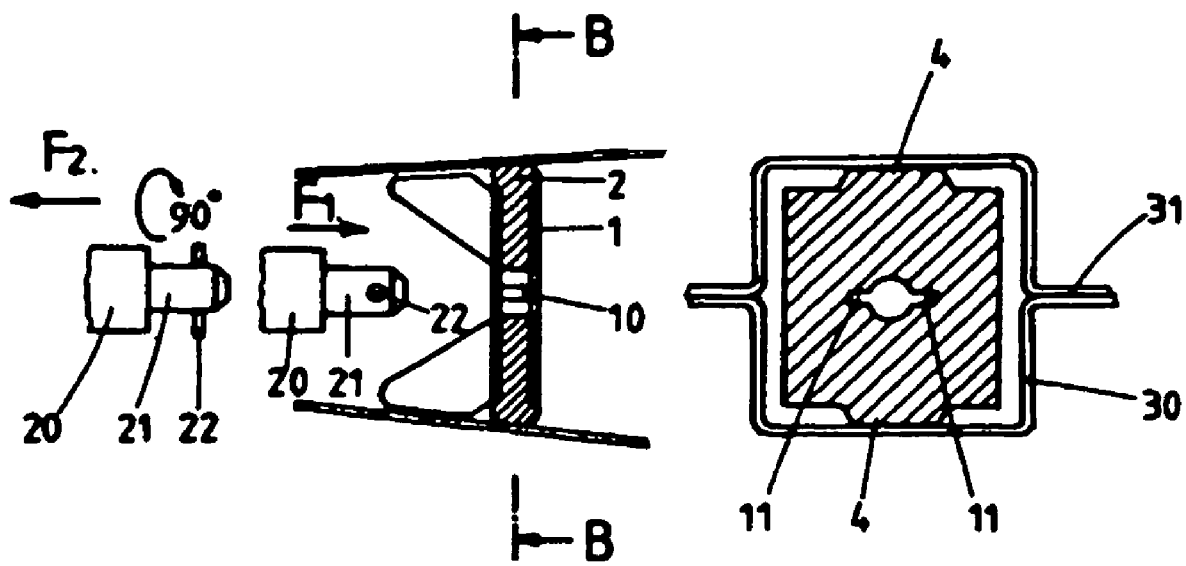
FIG. 5 shows mounting of a bulkhead part by pulling.
FIG. 6 shows a section through the bulkhead part and the hollow section along line B—B.

FIG. 5 shows a process for fixing the bulkhead part, wherein the bulkhead part has been brought into its final position by pulling with the aid of the mounting aid and has been fixed there. For this purpose the mounting aid also has a latching device (22) in the tapered part (21). In the simplest embodiment this latching device (22) is a transverse pin arranged perpendicular to the longitudinal axis of the mounting aid in the taper (21). For the purpose of inserting the mounting aid into the bulkhead part by moving the mounting aid in the direction of the arrow (F1), the aperture (10) in the bulkhead part has recesses in the manner of a "keyhole", through which the latching device (22) can be guided. As soon as the mounting aid has been inserted in the final position, which is to be latched, in the bulkhead part, the mounting aid is rotated about its longitudinal axis (e.g. by approximately 90°), and then the bulkhead part with the mounting aid is pulled into the hollow section in the direction of the arrow (F2) until it is fixed in its final position by virtue of the friction forces of the contact faces on the inner walls of the hollow section. Subsequently the mounting aid is rotated back again and pulled out of the bulkhead part.

FIG. 6 shows a section along line B—B through the bulkhead part and the hollow body according to FIG. 5. Here, once again, only the thermally expandable material with the contact faces of the projections (4) which are in contact with the inner wall of the hollow section (30) is shown. A possible support is not represented. Moreover, the slot-type recess (11) in the aperture (10) is shown here, through which the latching means (22) of the mounting aid (20) can be guided. Also in this case a hollow section with flange-type joints (31) is shown, it being possible for a seamless hollow section to find application also in this case.

FIG. 7 shows the mounting of a bulkhead part according to FIG. 2 having four supporting shackles (3) in a hollow section with uninterruptedly uniform cross-section—i.e., with substantially parallel walls (30) of the hollow section. In this case the bulkhead part has a protruding clamping face of a projection on one side only; in this connection the bulkhead part has a slight overdimension in relation to the clear cross-sectional aperture in the hollow section, as represented in position (P.1) in connection with inserting the bulkhead part into the hollow section. A bulkhead part of this embodiment having four supporting shackles (3) can then be introduced into the hollow section with the mounting aid (20) by exerting a pressure in the arrow direction (F) in such a way that, as represented in position (P.2), while overcoming the friction forces it can be pushed into the hollow section to the predetermined position until it is fixed there by the clamping face.

FIG. 8 shows a hollow section with a non-rectangular cross-section. Here more than two projections (4) which are in frictional contact with the inner wall of the hollow section (30) are needed for stabilizing fixation. Furthermore, FIG. 8 shows other possible embodiments of the projections (4) in the form of lamelliform lips with substantially (rounded) triangular shapes (41) as well as semicylindrical sections (42) or hemispherical sections (43).

FIG. 9 shows a bulkhead part in which the support (1) has in its middle a film hinge (5) which is optionally interrupted at the receiving aperture (10) for the mounting aid and which moreover has a slot-shaped recess (11) analogous to the representation in FIG. 6 (not shown here). In (A) the start of mounting is represented, the bulkhead part is slightly folded with the aid of the film hinge in the manner of butterfly wings, so that its extent is less than the clear distance between the walls (30) of the hollow section. Here a bipartite mounting aid is represented by way of mounting aid, consisting of a tubular part (24) in which a rod-shaped part (23) is arranged in axially displaceable manner which has a latching means (22) in the form of a transverse pin at right angles to the longitudinal axis. With a view to connecting the bulkhead part to the mounting aid, the rod-shaped part (23) is pushed in the direction of the arrow (F1) through the aperture (10) in the bulkhead part in such a way that the transverse pin (22) can be guided through the corresponding recess. Subsequently the rod-shaped end part (23) is rotated about its longitudinal axis by approximately 90°, so that latching of the mounting aid on the bulkhead part is possible; this position is shown in (B). Subsequently the bulkhead part is brought in the direction of the arrow (F1) with the aid of the mounting aid into its position to be fixed in the hollow section. As soon as this position has been reached, the mounting aid is pulled in the direction of the arrow (F2), whereupon the bulkhead part is unfolded in the direction of the curved arrows (S) and is given its effective full extent and is able to enter into frictional contact with the inside of the hollow-section wall (30) and is fixed in this way. As a result of opposite rotation of the rod-shaped end part (23) of the mounting aid, the latter can then be unlatched from the bulkhead part and the mounting aid can be separated from the bulkhead part by being pulled out of the hollow section.

A bulkhead part of such a type that is capable of folding via a film hinge may, in principle, also be constructed without an auxiliary aperture (10). Said bulkhead part is then pushed into the hollow section from the bent-inward side in the butterfly-type folded form with the aid of a simple rod. In FIG. 9 the bent-inward side in position (A) corresponds to the right-hand side of the representation. As soon as the position to be fixed of the bulkhead part has been reached, the bulkhead part is unfolded by pressure with the rod from the opposite side and in this way is likewise given its effective extent and is therefore able to enter into frictional contact with the inside of the hollow-section wall (30) and be fixed in this way.

Figure 10:
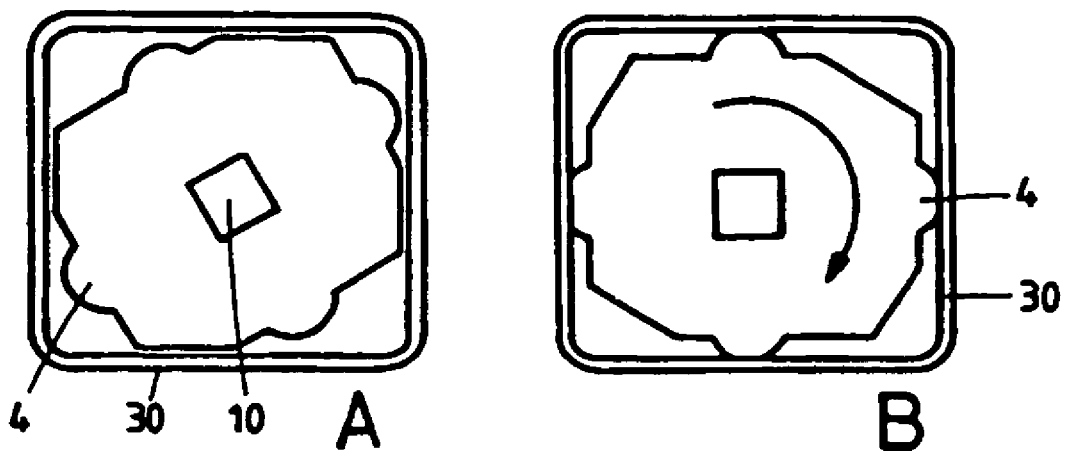
FIG. 10 shows clamping by twisting the bulkhead part.

FIG. 10 shows an embodiment of the bulkhead part having an asymmetrical ratio of the cross-sectional axes of the bulkhead part. This bulkhead part has a polygonal aperture (10) and by reason of its asymmetrical ratio of the cross-sectional axes has such dimensions that it can be easily pushed in diagonal form through the hollow section, represented in position (A). In this case the mounting aid likewise has a polygonal taper which fits into the corresponding aperture (10). In the concrete case a square aperture is shown, to which a corresponding square cross-section of the taper of the mounting aid (not shown here) pertains. However, triangular, hexagonal, octagonal etc (polygonal) cross-sections of the apertures and of the corresponding tapered part of the mounting aid are also possible.

As soon as the bulkhead part has been pushed or pulled with the aid of the mounting aid to the predetermined point in the hollow section, the bulkhead is positioned by rotation about the longitudinal axis of the mounting aid in such a way that the projections (4) enter into frictional contact with the inner wall of the hollow section (30) and in this way fix the bulkhead part; this position is represented in (B). Not shown in this case is a support part of the bulkhead part, which is optionally present.

Figure 11:
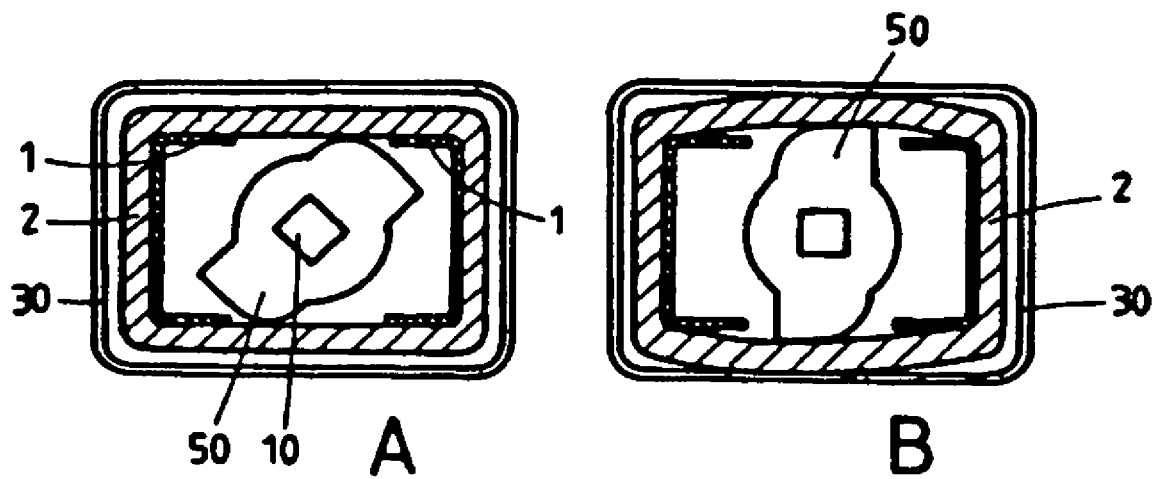
FIG. 11 shows clamping by twisting with the aid of an installed clamping mechanism.

FIG. 11 shows a bulkhead part, the support (1) of which has a rotatably supported part (50) having an asymmetrical cross-sectional axial ratio and which has a polygonal—in the specific case, rectangular—aperture (10). In the position shown in (A), this latching rotating part (50) is not acting against the inside of the thermally expandable material (20). Since the total cross-section of the bulkhead part, including the thermally expandable material (2), is smaller than the cross-sectional aperture in the hollow section, the bulkhead part can be pushed or pulled without force as far as the designated point in the hollow section. As soon as this point has been reached, the latching device (50) is twisted about the axis perpendicular to the cross-sectional plane of the bulkhead part, so that the latching device (50) acts from inside against the thermally expandable material (2) and the latter is pressed against the inner wall of the hollow section (30) and in this way fixes the bulkhead part at the designated point with the aid of the friction force.

Figure 12:
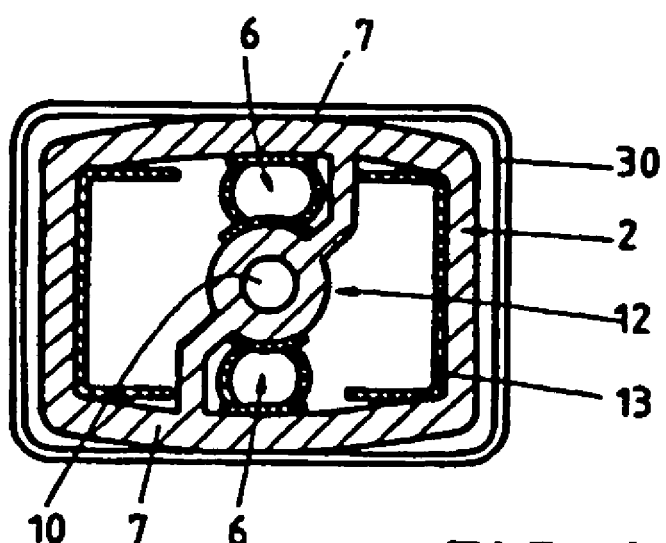
FIG. 12 shows fixing by spring force.

FIG. 12 shows another configuration, according to the invention, of the bulkhead part and its arrangement in the hollow section. In this case the support is of multi-part design; it consists of two plates (not shown) which are held together by the edge boundary (13) and which serve by way of boundary for the thermally expandable material (2). Moreover, the support has two devices (6) which are formed in such a way that they act like a spring mechanism on the thermally expandable material (2) and in this way bring the thermally expandable material in the direction of at least one cross-sectional axis under bias in such a way that they press the clamping faces zonally directly against the inner wall of the hollow section (30). In the course of inserting this bulkhead part at the beginning of the cross-sectional aperture the thermally expandable material in the regions (7) has to be pressed contrary to the spring force of the devices (6) and the bulkhead part has to be introduced into the hollow section under this bias. Subsequently it can be pushed to the predetermined position in the hollow section with the aid of a normal mounting aid which is inserted into the aperture (10). In this case the aperture (10) is surrounded by thermally expandable material. In the course of the foaming of the expandable material the aperture (10) which is necessary only for mounting purposes is then likewise sealed.

Figure 13:
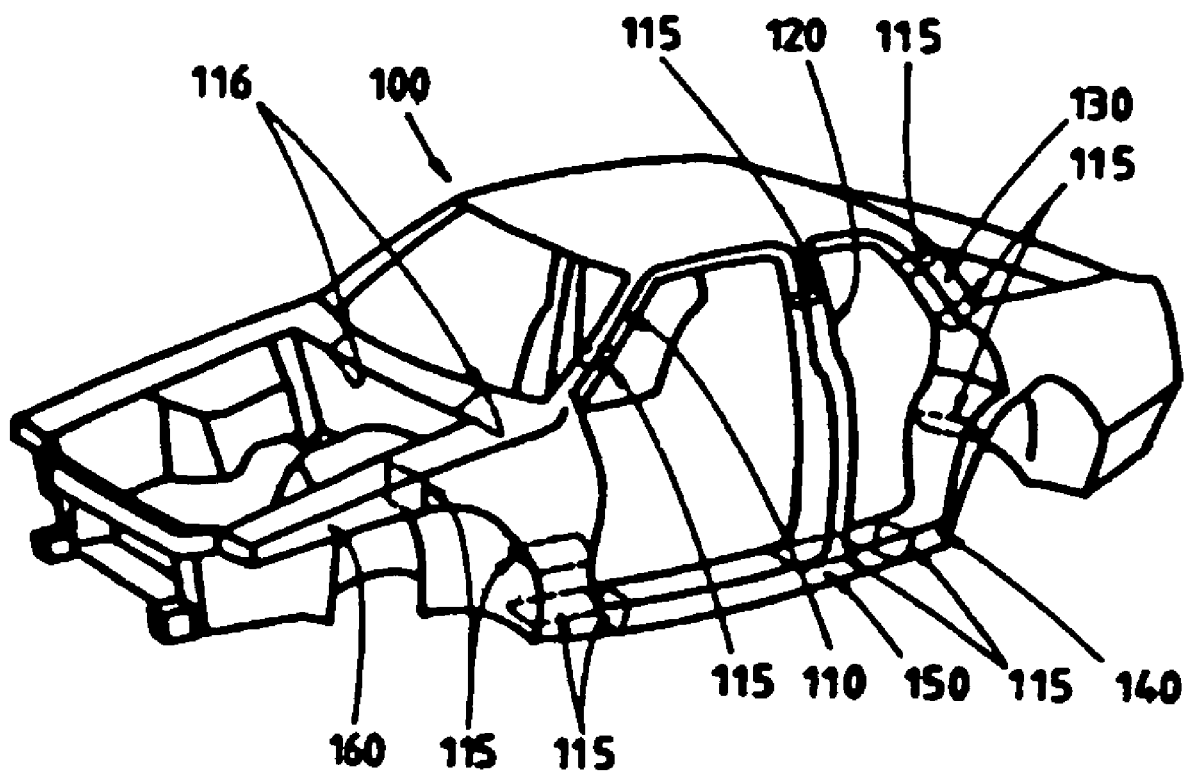
FIG. 13 shows a vehicle body with hollow-section-type components and possible positions for bulkhead parts.

FIG. 13 shows a schematic representation of a vehicle body in which hollow sections to be sealed are apparent. These are the A-pillar (110), B-pillar (120), C-pillar (130), the sill (150), the base of the rear mudguard (140) as well as the front mudguard regions (160), into which, in each instance, bulkhead parts (115) of the aforementioned embodiments have been introduced. Moreover, bulkhead parts (116) of the aforementioned type have been used in constructing the hollow-section part below the windscreen.

What is claimed is:

1. A sealing and acoustically active bulkhead part, suitable for mechanical fixation in a cavity of a structural component, wherein the bulkhead part comprises an outer edge region comprised of a thermally expandable material having a high coefficient of friction in relation to metal and/or plastics, an inner region having at least one of an aperture or a recess for receiving a mounting aid and an inner support having a rotatable device with an asymmetrical cross-section.

2. A bulkhead part according to claim 1, wherein the inner support is comprised of a thermoplastic and/or metal and the thermally expandable material surrounds the outer edge region.

3. A bulkhead part according to claim 1, additionally comprising one or more supporting shackles for the purpose of stabilization.

4. A bulkhead part according to claim 1, wherein the outer edge region has a projection at least at one point.

5. A bulkhead part according to claim 1, additionally comprising a film hinge which enables the bulkhead part to be folded for the purpose of fixing the bulkhead part in the cavity.

6. A bulkhead part according to claim 1, wherein the inner support has at least one molding exerting spring force which presses the thermally expandable material zonally against the inner wall of the cavity.

7. A bulkhead part according to claim 1, wherein the outer edge region has at least one projection in a form selected from the group consisting of lamellae and lips with a shape selected from the group consisting of triangular, rectangular, trapezoidal, semicylindrical, pyramidal, frustropyramidal and hemispherical.

8. A bulkhead part according to claim 1, wherein the thermally expandable material has a coefficient of friction μ of at least 0.5 (according to DIN 63375).

9. A bulkhead part according to claim 1, wherein said inner support is comprised of two support plates with at least a portion of said thermally expandable material being between the two support plates.

10. A bulkhead part according to claim 1, wherein said inner support is comprised of two support plates with an interspace between the two support plates and wherein the thermally expandable material is present in said interspace and also protrudes beyond said interspace.

11. A bulkhead part according to claim 1, wherein said inner support is comprised of two support plates and said bulkhead part additionally comprises two or more supporting shackles for the purpose of stabilization perpendicular to said support plates.

12. A bulkhead part according to claim 1, wherein said inner support is injection molded and is comprised of at least one thermoplastic selected from the group consisting of polyamides, polyimides, and polyethyleneterephthalate.

13. A bulkhead part according to claim 1, wherein said inner support has a U-shaped boundary in which the thermally expandable material is located and wherein the thermally expandable material protrudes from the U-shaped boundary.

14. A process for fixing a bulkhead part in a hollow sections, said bulkhead part comprising an outer edge region comprised of a thermally expandable material having a high coefficient of friction in relation to metal and/or plastics and an inner region having at least one of an aperture or a recess for receiving a mounting aid, said process comprising the steps:
   a) connecting said bulkhead part to the mounting aid by introducing a tapered socket into the aperture in the bulkhead part, optionally followed by rotating the mounting aid about the axis thereof to interlock the bulkhead part and the mounting aid;
   b) inserting the bulkhead part into the hollow section, whereby said bulkhead part
      (i) is inserted, when the hollow section is tapered, at the larger cross-sectional end and is pushed or pulled with the aid of the mounting aid until self-fixation occurs by virtue of clamping action; or
      (ii) is inserted, when the hollow section has a constant cross-section, at one cross-sectional end of the hollow section and is pulled or pushed to a predetermined point under constant application of force and is fixed there with the aid of at least one means selected from the group consisting of clamping by point contact or area contact of one or more projections in the outer edge region, folding-upwards of the bulkhead part, twisting of the bulkhead part as a result of rotation of the mounting aid about its longitudinal axis and spring action; and
   c) separating the mounting aid from the bulkhead part and removing the mounting aid from the hollow section.

15. A combination comprising a bulkhead part in accordance with claim 1 and a mounting aid suitable for fixing said bulkhead part in a hollow section.

16. A sealing and acoustically active bulkhead part, suitable for mechanical fixation in a cavity of a structural component, wherein the bulkhead part comprises an outer edge region comprised of a thermally expandable material having a high coefficient of friction in relation to metal and/or plastics and an inner region having an aperture that has a circular, elliptical or polygonal cross-section and at least one recess for latching a mounting aid.

17. A bulkhead part according to claim 16, wherein the bulkhead part comprises an inner support comprised of a thermoplastic and/or metal and the thermally expandable material surrounds the outer edge region.

18. A bulkhead part according to claim 16, additionally comprising one or more supporting shackles for the purpose of stabilization.

19. A bulkhead part according to claim 16, wherein the outer edge region has a projection at least at one point.

20. A bulkhead pad according to claim 16, additionally comprising a film hinge which enables the bulkhead part to be folded for the purpose of fixing the bulkhead part in the cavity.

21. A bulkhead part according to claim 16, wherein the bulkhead part comprises an inner support having at least one molding exerting spring force which presses the thermally expandable material zonally against the inner wall of the cavity.

22. A bulkhead part according to claim 16, wherein the outer edge region has at least one projection in a form selected from the group consisting of lamellae and lips with a shape selected from the group consisting of triangular, rectangular, trapezoidal, semicylindrical, pyramidal, frustropyramidal and hemispherical.

23. A bulkhead part according to claim 16, wherein said bulkhead part comprises an inner support comprised of two support plates with at least a portion of said thermally expandable material being between the two support plates.

24. A bulkhead part according to claim 16, wherein said bulkhead part comprises an inner support comprised of two support plates with an interspace between the two support plates and wherein the thermally expandable material is present in said interspace and also protrudes beyond said interspace.

25. A bulkhead part according to claim 16, wherein the thermally expandable material has a coefficient of friction $\mu$ of at least 0.3 (according to DIN 53375).

26. A bulkhead part according to claim 16, wherein said bulkhead part comprises a) an inner support comprised of two support plates and b) two or more supporting shackles for the purpose of stabilization perpendicular to said support plates.

27. A bulkhead part according to claim 16, wherein said bulkhead part comprises an injection molded inner support comprised of at least one thermoplastic selected from the group consisting of polyamides, polyimides, and polyethyleneterephthalate.

28. A bulkhead part according to claim 16, wherein said bulkhead part is manufactured integrally from said thermally expandable material and does not comprise a support.

29. A bulkhead part according to claim 16, wherein said bulkhead part comprises an inner support having a U-shaped boundary in which the thermally expandable material is located and wherein the thermally expandable material protrudes from the U-shaped boundary.

30. A combination comprising a bulkhead part in accordance with claim 16 and a mounting aid suitable for fixing said bulkhead part in a hollow section.

* * * * *

UNITED STATES PATENT AND TRADEMARK OFFICE
CERTIFICATE OF CORRECTION

| | |
|---|---|
| PATENT NO. | : 7,140,668 B2 |
| APPLICATION NO. | : 11/064897 |
| DATED | : November 28, 2006 |
| INVENTOR(S) | : Wesch et al. |

It is certified that error appears in the above-identified patent and that said Letters Patent is hereby corrected as shown below:

Column 8, line 53, delete "63375" and insert therefor --53375--.

Column 9, line 11, delete "sections" and insert therefor --section--.

Column 10, line 3, delete "pad" and insert therefor --part--.

Signed and Sealed this

Thirteenth Day of February, 2007

JON W. DUDAS
*Director of the United States Patent and Trademark Office*